March 26, 1946.  A. SERKES ET AL  2,397,163
DRAIN ATTACHMENT FOR COOKING POTS
Filed Sept. 18, 1943

INVENTORS
John Teska
Aaron Serkes
BY
ATTORNEY

Patented Mar. 26, 1946

2,397,163

UNITED STATES PATENT OFFICE 2,397,163

DRAIN ATTACHMENT FOR COOKING POTS

Aaron Serkes and John Teska, Bronx, N. Y.

Application September 18, 1943, Serial No. 502,936

3 Claims. (Cl. 210—163.5)

This invention relates to new and useful improvements in a drain attachment for cooking pots.

More specifically, the invention proposes the construction of a drain attachment adapted to be mounted upon the side of a cooking pot or other vessel in a manner to permit liquids contained within the pot to be drained from the solids contained in the pot without spilling the solids contained therein.

Another object of the invention proposes characterizing the drain attachment by a perforated arcuately shaped sheet member having a curved side arranged to conform with the circular configuration of the pot or other vessel, and which is provided with a plurality of perforations permitting the liquids to pass therethrough when the pot is tilted to the side provided with the drain attachment.

Still further it is proposed to provide the drain attachment with adjustably mounted spring clips adapted to be engaged with the sides of the pot or other vessel, and which are adjustable to permit the drain attachment to be used upon pots or vessels of different sizes.

Still another object of the invention proposes the constructing of the sheet member of a pair of segmental sheet sections which are pivotally connected together in a manner to be extended when desired to cover a larger area of the side of the pot or container, permitting the container to be tilted to a greater degree regardless of the quantity of solids within the pot and permitting the water to be completely drained therefrom without spilling the solid contents.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 1:
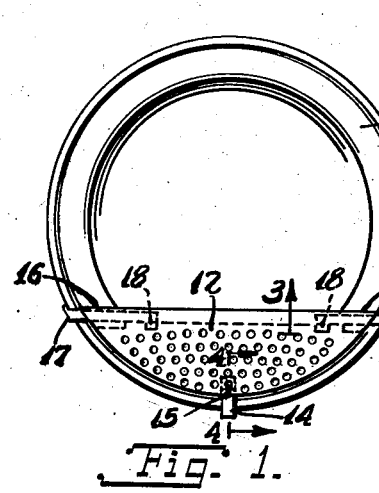
Fig. 1 is a plan view of a cooking pot provided with a drain attachment in accordance with this invention.
Figure 2:
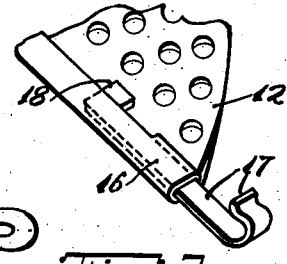
Fig. 2 is a bottom perspective view of one corner of the drain attachment, per se.
Figure 3:
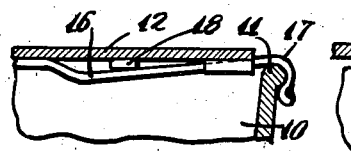
Fig. 3 is an enlarged partial sectional view taken substantially on the line 3—3 of Fig. 1.
Figure 4:
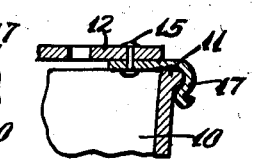
Fig. 4 is an enlarged partial vertical sectional view taken substantially on the line 4—4 of Fig. 1.

The drain attachment for cooking pots, according to this invention, is to be used in combination with a pot 10 or other similar vessel which has a rolled top edge 11 extended outwards of the side walls thereof. The drain attachment is characterized by a perforated arcuately shaped sheet member 12 which is arranged to extend against one side of the pot 10, as shown in Fig. 1. The sheet member is characterized by a straight side and an opposed curved side with a spring clip 14 being mounted on the center of the curved side for engaging the side of the pot 10 and, more specifically, the rolled top edge 11 thereof. This spring clip is constructed of metal and is securely attached to the sheet member 12 by means of a rivet 15.

Tubular portions 16 are formed upon the ends of the straight side of the sheet member 12 and slidably support spring clips 17. The spring clips 17 are slidably extended through the tubular portions 16 and are provided at their inner ends with outwardly projecting lugs 18 which are adapted to strike the inner end of the tubular portions 16 preventing the clips 17 from being completely disengaged from the tubular portion 16. The spring clips 17 are frictionally slidably extended through the tubular portion 16 so that they will maintain desired adjusted position. The clips 17 are slidably mounted to permit the sheet member 12 to be fixedly engaged upon the pots or vessels of different diameters.

The operation of this form of the invention is as follows:

When it is desired to drain liquids from the solids contained within a pot 10 or other similar vessel, it is merely necessary to engage the sheet member 12 upon one side of the pot or vessel and tilt the pot to the side provided with the attachment permitting the water to pass through the perforations formed in the sheet member while the solids are retained within the pot by the sheet member. The engagement of the sheet member 12 on the pot is accomplished as follows: First, the spring clip 14 is engaged with an adjacent area of the rolled top edge 11 of the pot 10. The spring clips 17 are then extended beyond the sides of the pot 10 and are then pushed inwards, causing their clip portions to also engage the rolled top edge 11 of the pot 10 to securely maintain the drain attachment in position thereof. To remove the drain attachment the above procedure is reversed.

Figure 5:
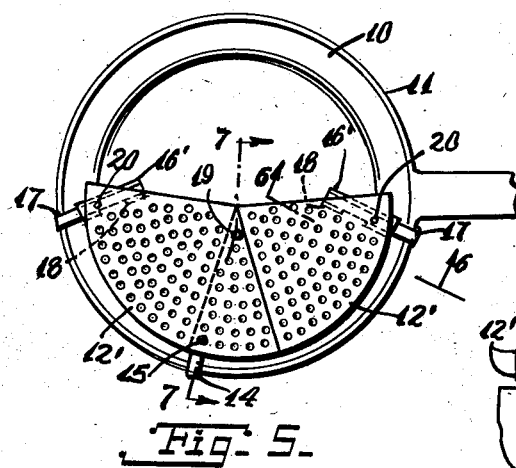
Fig. 5 is a view similar to Fig. 1 but illustrating a modification of the invention.
Figure 6:
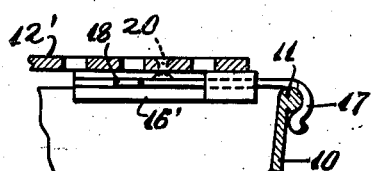
Fig. 6 is an enlarged partial vertical sectional view taken on the line 6—6 of Fig. 5.
Figure 7:
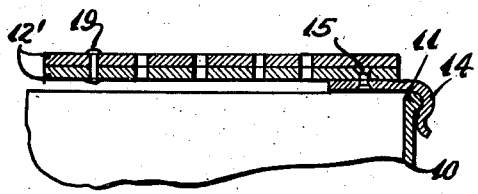
Fig. 7 is an enlarged partial vertical sectional view taken on the line 7—7 of Fig. 5.

In the form of the invention shown in Figs. 5 and 6 the drain attachment is characterized by a pair of perforated segmental sheet members 12' which are pivotally connected together at their apexes by means of a rivet 19. The spring clip 14 is mounted upon the bottom face of one of the segmental members 12'.

The outer corner of each of the segmental members 12' is provided with a separate tubular member 16' which is pivotally supported upon its respective corner by means of a rivet 20. These pivotally supported tubular members 16' slidably support the spring clips 17 which are adapted to be engaged with the sides of the pot or container 10. The use of the drain attachment as shown in this modification is similar to that previously described, except that the formation of the draining attachment of separate segmental members pivotally connected together permits a greater area of the side of a pot or vessel to be covered by the drain attachment, permitting the container to be tilted to a greater degree to entirely drain the water from the interior thereof regardless of the quantity of solids contained within the pot. The pivotal mounting of the tubular member 16' permits the spring clips 17 to be engaged with the sides of the pot 10 regardless of the pivotal position of the segmental members 12'.

In other respects this form of the invention is similar to that previously shown and like reference numerals identify like parts in each of the several views.

Figure 8:
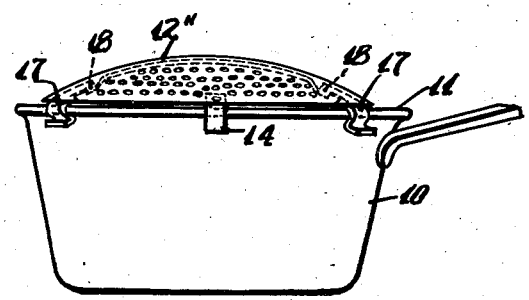
Fig. 8 is a side elevational view of a cooking pot provided with a drain attachment constructed in accordance with a still further modification of the invention.

In Fig. 8 the drain attachment is similar to that described in Figs. 1-4, except that the sheet member 12" is convexed upwardly. In other respects this form of the invention is similar to that previously shown and like reference numerals identify like parts in each of the several views.

While we have illustrated and described the preferred embodiments of our invention, it is to be understood that we do not limit ourselves to the precise constructions herein disclosed and the right is reserved to all changes and modifications coming within the scope of the invention as defined in the appended claims.

Having thus described our invention, what we claim as new, and desire to secure by United States Letters Patent is:

1. A drain attachment for cooking pots, comprising a pair of perforated segmental sheet members pivotally connected at their apexes and adapted to extend across the side of a pot or other vessel, a spring clip mounted on a central portion of the curved side of one of said members, tubular members swivelly mounted on the outer ends of the curved sides of said members, and spring clips slidably extended from said tubular portions for engaging side portions of said pot or vessel.

2. A drain attachment for cooking pots, comprising a pair of perforated segmental sheet members pivotally connected at their apexes and adapted to extend across the side of a pot or other vessel, a spring clip mounted on a central portion of the curved side of one of said members, tubular members swivelly mounted on the outer ends of the curved sides of said members, and spring clips slidably extended from said tubular portions for engaging side portions of said pot or vessel, said segmental members being pivotally connected by a rivet extended through their apexes.

3. A drain attachment for cooking pots, comprising a pair of perforated segmental sheet members pivotally connected at their apexes and adapted to extend across the side of a pot or other vessel, a spring clip mounted on a central portion of the curved side of one of said members, tubular members swivelly mounted on the outer ends of the curved sides of said members, and spring clips slidably extended from said tubular portions for engaging side portions of said pot or vessel, said tubular members being swivelly mounted by rivets extended through the ends of said segmental members and the top walls of said tubular members.

AARON SERKES.
JOHN TESKA.